Figure 1:
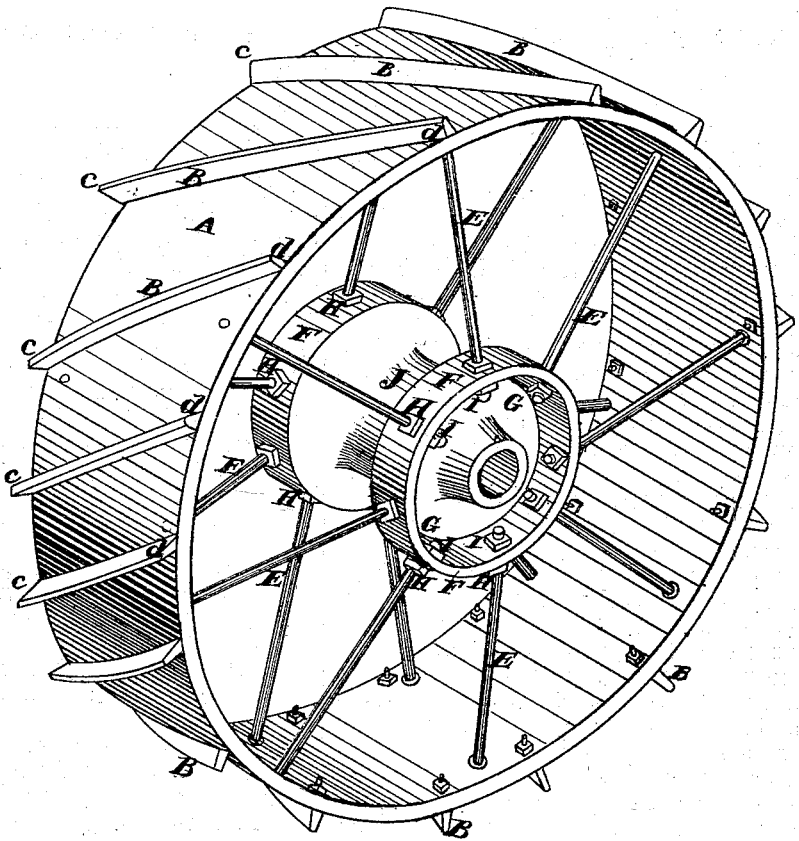

W. O. M. BERRY.
Traction-Wheel.

No. 168,866.

Patented Oct. 19, 1875.

Witnesses
Jno. L. Boone,
C. M. Richardson

Inventor
William O. M. Berry
by Dewey & Co
Att'ys

N. PETERS, PHOTO-LITHOGRAPHER, WASHINGTON, D. C.

UNITED STATES PATENT OFFICE.

WILLIAM O. M. BERRY, OF SAN FRANCISCO, CALIFORNIA.

IMPROVEMENT IN TRACTION-WHEELS.

Specification forming part of Letters Patent No. 168,866, dated October 19, 1875; application filed July 29, 1874.

*To all whom it may concern:*

Be it known that I, WILLIAM O. M. BERRY, of San Francisco city and county, State of California, have invented a Traction-Wheel for Harvesting and other Machines; and I do hereby declare the following description and accompanying drawings are sufficient to enable any person skilled in the art or science to which it most nearly appertains to make and use my said invention without further invention or experiment.

My invention relates to certain improvements in traction-wheels, and more especially such as are employed upon headers and mowing-machines; and it consists in the combination and arrangement of devices hereinafter described and claimed.

Referring to the accompanying drawing, Figure 1 is a perspective view of a wheel of my construction.

A is the rim of my wheel, made sufficiently broad to give the required tread and support the machine. The ribs B are placed diagonally across the face of the rim A at an angle of about forty-five degrees, and at such a distance apart that the end C of any rib at one edge of the face will not leave the ground until the next rib touches the ground at the opposite end $d$, thus making the tread, in effect, always upon the ribs. By this construction I am enabled to work my machine upon hill-sides without the difficulty of slipping sidewise.

In order to make a stiff wheel, and at the same time light, I make the spokes E of wrought iron rods, in two sets, one at each side of the rim. The hub is made in the form of a double cup, F F, as shown, with the larger ends outward. A hole is bored for the shaft or axle, and around this hole, at each end of the hub, is a depression or groove, G. The inner ends of the spokes pass through the rim of the hub into this groove, and each spoke is provided with two nuts—one, H, upon the outside of the hub, and the other, I, on the inner end of the spoke. By means of these nuts the tension of any or all of the spokes can be regulated, and the rim kept in proper relative position to the center of the hub. By making the portion J of the hub smaller, lightness is insured.

I am aware it is not new to secure spokes to the rim of hubs by means of screws and screw-taps on the inner ends of the spokes; nor is it new to make hubs of the double-cup shape, with a central depression; therefore I do not claim this, broadly.

Having thus described my invention, what I claim, and desire to secure by Letters Patent, is—

The hub F F, depressed at J, and having the grooves G, in combination with the spokes E, nuts H and I, and the rim A, having ribs B, all substantially as and for the purpose set forth.

In witness whereof I hereunto set my hand and seal.

WILLIAM O. M. BERRY. [L. S.]

Witnesses:
JNO. L. BOONE,
C. M. RICHARDSON.